US009813534B2

(12) United States Patent
Koltsov et al.

(10) Patent No.: US 9,813,534 B2
(45) Date of Patent: Nov. 7, 2017

(54) METHOD AND APPARATUS FOR TESTING CELL PHONES

(71) Applicant: Teleplan Technology B.V., Schiphol (NL)

(72) Inventors: Mihhail Koltsov, Tallinn (EE); Eiko Priidel, Harjumaa (EE); Ilja Umov, Harjumaa (EE); Madis Kerner, Harjumaa (EE); Mällon Lobjakas, Harjumaa (EE)

(73) Assignee: TELEPLAN TECHNOLOGY B.V., Den Haag (NL)

( * ) Notice: Subject to any disclaimer, the term of this patent is extended or adjusted under 35 U.S.C. 154(b) by 0 days.

(21) Appl. No.: 15/137,147

(22) Filed: Apr. 25, 2016

(65) Prior Publication Data

US 2016/0301786 A1    Oct. 13, 2016

Related U.S. Application Data

(63) Continuation of application No. PCT/IB2014/002201, filed on Oct. 22, 2014.

(51) Int. Cl.
| | |
|---|---|
| *H04W 24/00* | (2009.01) |
| *H04M 1/24* | (2006.01) |
| *H04M 1/04* | (2006.01) |
| *H04W 4/02* | (2009.01) |

(52) U.S. Cl.
CPC ............... *H04M 1/24* (2013.01); *H04M 1/04* (2013.01); *H04W 4/026* (2013.01); *H04W 24/00* (2013.01)

(58) Field of Classification Search
CPC ......... H04M 1/24; H04M 1/04; H04W 24/00; H04W 4/026
See application file for complete search history.

(56) References Cited

U.S. PATENT DOCUMENTS

| | | | |
|---|---|---|---|
| 6,752,391 B1 | 6/2004 | Euker | |
| 2001/0008832 A1* | 7/2001 | Kaindl | H04W 24/00 455/67.14 |
| 2002/0050322 A1 | 5/2002 | Kunisawa et al. | |
| 2002/0127971 A1* | 9/2002 | Chen | H04B 17/16 455/67.14 |
| 2006/0068713 A1* | 3/2006 | Chang | H04M 1/24 455/67.11 |
| 2007/0069756 A1 | 3/2007 | Ambler et al. | |

(Continued)

FOREIGN PATENT DOCUMENTS

WO    2010/031904    3/2010

OTHER PUBLICATIONS

The International Search Report as dated Jan. 30, 2015 for International Application No. PCT/IB2014/002201.

*Primary Examiner* — Ajit Patel
(74) *Attorney, Agent, or Firm* — Yakov S. Sidorin; Quarles & Brady LLP

(57) ABSTRACT

A phone holder for a mobile phone testing apparatus which comprises at least a base plate, a rest structure on the base plate for supporting a mobile phone, at least one block for contacting a mobile phone's narrow side, wherein the at least one block is moveably attached to the base plate, thereby enabling adapting the position of the block to a mobile phone being supported by said rest, and clamping means for releasable fixing the at least one first block in said position can be configured for securely holding almost any mobile phone model.

9 Claims, 4 Drawing Sheets

(56) References Cited

U.S. PATENT DOCUMENTS

| | | | |
|---|---|---|---|
| 2008/0200218 A1* | 8/2008 | Bobst | H04W 24/00 455/572 |
| 2009/0186666 A1* | 7/2009 | Bury | B60R 11/0241 455/573 |
| 2011/0183664 A1* | 7/2011 | Topaltzas | H04M 1/24 455/425 |
| 2012/0286815 A1 | 11/2012 | Chen et al. | |
| 2014/0197857 A1* | 7/2014 | Partee | G01R 1/02 324/750.15 |

* cited by examiner

METHOD AND APPARATUS FOR TESTING CELL PHONES

CROSS-REFERENCE TO RELATED APPLICATIONS

This application is a continuation of a International Application No. PCT/IB2014/002201 filed on 22 Oct. 2014 and now published as WO 2015/059553, which designates the United States and claims priority from the International Application No. PCT/IB2013/002382 filed on Oct. 24, 2013. The disclosure of each of these patent documents is incorporated herein by reference.

BACKGROUND

1. Field of the Invention

The invention relates to a tester for testing the correct operation of a mobile phone and to a method testing the correct operation.

2. Description of Relevant Art

Mobile phones, also referred to herein as cellular phones, smart phones or more generally mobile communication devices and the like are subjected to an extensive test of preferably all functions and buttons by so-called 'mobile phone testing apparatus'(referred to as 'testers' for short) after completion of the mobile phone's manufacture and before delivery to the clients. These testers typically have a housing with a phone holder as support for the mobile phone to be tested. The phone holder is particularly adapted to the respective model of mobile phone to be tested. Each time the model to be tested is changed, at least the phone holder has to be replaced by a new one being again particularly adapted to the new model.

EP 1 739 998 B1 discloses a tester for testing mobile phones. The tester has a phone holder as support for a mobile phone with a cavity being a negative mold of the mobile phone and being adapted to receive a certain type or model of mobile phone with the mobile phone's display facing upwards. The phone holder is replaceable to thereby adapt the tester to different types of mobile phones. A camera images the display and thus enables to detect defects.

KR 20060085509 discloses a phone holder for a mobile phone tester. The mobile phone is connected via an electrical connector to a computer for performing the tests. The phone holder has a base plate supporting a replaceable adapter for the mobile phone to be tested. The adapter is particularly adapted to the mobile phone which is to be tested. Additionally the base plate supports a height adjustable electrical connector for connecting the mobile phone to a controlling unit of the tester. The height adjustment significantly reduces the costs for the adapter, as the electrical connector is no longer part of the adapter.

US 2012/286815 A1 discloses a phone holder for a mobile phone testing apparatus with a receiving moldboard for the mobile phone. The receiving moldboard is mounted to on top of an inspection panel and has a receptacle being particularly adapted to the type shape of a particular type of mobile phone, therefore the moldboard is product specific part. After insertion of the mobile phone into the moldboard the mobile phone is secured by two clamping blocks. The clamping blocks are elastically supported in the vertical direction to thereby exert a downward force on the upper rim of the mobile phone and thus secure the mobile phone in the moldboard. The clamping blocks each have a recess being particularly adapted to receive the upper rim the mobile phone. Thus the rim of the secured mobile phone engages into said recesses. To release the mobile phone, the clamping blocks are lifted off and subsequently they can be pivoted around a vertical axis. Next, the mobile phone can be removed from the moldboard.

WO 2011/031904 discloses a test adapter configuration for mobile phones and the like. The test adapter comprises a common part and product specific part. The common part supports the product specific part, which is detachably mounted to the common part. The product specific part is particularly adapted to the mobile phone to be tested and so to speak an adapter to mechanically support a particular type of mobile phone and to position the corresponding probes, sensors, plugs and actuators relative to the mobile phone, which are required when testing a particular type of mobile phone.

There exists a vast variety of prior art relating to particular test routines, e.g. US 2012 0327796 A, CN 20256547 U, US 2012 212492 A, CN 102314386A to name only a few.

SUMMARY

The invention is based on the observation that mobile phone testing has been accomplished so far in line with the production of the respective mobile phone. As each production line usually produces only a single type of mobile phone, the tester has to be set up only once for the production cycle of the respective type of mobile phone. The tester is a product-specific part. This is, however, not suited for after-sales testing, be it e.g. a preparatory step before the repair or for the purpose of quality and risk management in the second-hand market.

The problem to be solved by the invention is to reduce the costs of the after-sales testing of mobile communication devices.

Only to be more illustrative, the term mobile phone is used as a synonym for the more general term "mobile communication device".

Solutions of the problem are described in the independent claims. The dependent claims relate to further improvements of the invention.

The core idea of the invention is to provide a tester for mobile phones and the like that is not particularly suited for a particular type of mobile phone, but instead can be adjusted to receive almost any mobile phone.

A phone holder for being preferably detachably mounted to a mobile phone testing apparatus comprises preferably at least one a base plate and a rest structure. The plate may be adapted to a complementary receptacle of a mobile phone testing apparatus. A rest structure is mounted to the base plate or is integrally formed on or in the base plate. The rest structure may have a preferably at least approximately plane rest surface as rest for e.g. the rear side of a mobile phone. The rest surface is thus preferably not particularly adapted to the shape of a particular mobile phone, but should be able to accommodate any kind of a typical mobile phone. To this end the rest surface may be defined by the up facing surfaces of one, two or more support elements, which are preferably adjustable relative to each other and/or to the base plate. These support elements define at least three (or more) support surfaces or points defining a triangle. The support points (or support areas, or support lines) may be provided by up-facing sides of support elements like rods or the like. The smaller the surface(s) of the up-facing sides of the support elements, the better is the accessibility of the mobile phone's rear side. At least one of the support elements is preferably adjustable relative to the base plate and can be releasably fastened, i.e. fixed in an adjustable position. The term adjustable means that the position of the respective support elements can be changed and fixed in a new position, e.g. by clamping means, enabling to releasable clamp the movable the support element(s) e.g. against the base plate or support element mounted to said base plate to obtain a frictional locking of the support element. The support structure can thus be adapted to at least almost any kind of mobile phone or the like. The rest structure preferably positions the mobile phone only vertically.

The phone holder has at least two blocks for contacting the mobile phone's narrow sides and to thereby define the mobile phone's horizontal position when the mobile phone is inserted between said blocks. These blocks provide horizontal stops for the mobile phones narrow sides. At least one of these blocks is moveably attached to the base plate and/or the rest structure and the position and orientation can be adjusted horizontally. This enables to define the horizontal position of the mobile phone by (mechanically) contacting the mobile phone's narrow side with the blocks, i.e. the horizontal stops. In the adjusted position the at least one block can be releasable fastened, e.g. by clamping means clamping the block against the base plate and/or the rest structure to thereby obtain a frictional locking of the block in its position. Thus, thereby enabling to adapt the position of the movable block can be adapted to any mobile phone by releasing the fastening, moving the block to a new position adapted to said new mobile phone and fasten, i.e. fix the block again to any mobile phone being supported by said rest while the mobile phone is in contact with the at least one other block. Once adjusted relative to the rest and secured in the adjusted position, the movable block enables to repeatably position a mobile phone on the rest. In a preferred embodiment, at least one movable block is configured to contact not the mobile phone's up facing surface, but only its narrow side. As well at least one other block is configured to contact not the mobile phone's up facing surface, but only its narrow facing side.

The movable block thus can be brought in a so-called contacting position. In other words, at least almost any mobile phone can be accommodated on the rest structure whereby at least two of the mobile phone's narrow sides can be brought in contact with these blocks. The movable block can be attached releasably relative to the base plate and/or the rest. For example, the movable block can be clamped by clamping means in said contacting position to the base plate and/or the support structure and released to be movable again. Instead of or additionally to the clamping means, at least one block may be spring-loaded towards the mobile phone's narrow side, i.e. spring-loaded towards the rest structure's rest surface, preferably the center of the rest surface. Such mobile phone holder can be adapted very easily, very quickly and with very low effort to securely accommodate almost any type of mobile phone. This enables the testing of almost any type of mobile phone in an accordingly-equipped mobile phone testing apparatus.

Preferably, the rest structure comprises a layer of an elastic material, e.g. of rubber or silicone. The elastic material protects the surface of the mobile phone and reduces slip of the mobile phone on the rest structure. It is of particular advantage, if the rest structure comprises at least one suction cup for generating a low pressure zone between a mobile phone and the rest structure, to thereby releasably attach the mobile phone to the rest structure. The mobile phone is so-to-speak 'locked' in its position if the suction cup is active, i.e. if the low pressure zone is engaged). Thus, preferably at least one suction cup has an opening facing away from the rest towards the mobile phone such that a rim of the suction cup contacts a mobile phone being positioned on the rest. The suction cup can be integrally formed in the rest structure. The suction cup can be connected to a low pressure source, e.g. a vacuum pump. The pressure in the suction cup, or more precisely between the mobile phone and the support structure can be controlled by valves and/or a vacuum pump, these may be controlled manually or by controlling unit.

Preferably, the rest structure comprises a spacer being positioned preferably on the base plate and preferably below the layer of an elastic material. Thus, the spacer may be positioned between the base plate and the layer of elastic material. The spacer so-to-speak lifts the mobile phone above the base plate and thus enables access to the mobiles phones base plate facing side, e.g. to a camera opening in the rear side of a mobile phone, to a loudspeaker, control buttons and the like. In a very simple embodiment, the spacer has the form of a frame. The rear side of the frame can be attached to the base plate and the front side of the frame may serve as rest surface and/or support said layer of an elastic material and/or at least one suction cup. Alternatively the spacer may have a box like structure. The side walls of the base may rest on the base plate and the boxes bottom may form a rest surface either for a mobile phone and/or a layer of an elastic material. In other words, the rear side of the 'box' may face away from the base plate. The bottom may have openings, to access controls or input- and other output devices, like e.g. a built in camera or a flash light, of the mobile phone via measurement devices positioned in said openings of the bottom.

Access to the mobile phone can be further enhanced, if the base plate has at least one opening for providing access to the mobile phone's base plate facing side.

It is particularly preferred if the base plate has at least three openings, between which are at least two beams supporting the (at least one) spacer, to thereby provide even better access to the mobile phone. The advantage of three neighbored openings is that they are separated by at least one beam which so to speak bridges the openings and which may provide a solid rest for e.g. the spacer. Other numbers of openings may be suited as well, as long as the stability of the rest structure is not compromised. The rest can be mounted to at least one of said beams.

If at least one finger is moveably attached to the base plate at least one measurement device can be supported by the finger and brought in a desired position relative to the mobile phone. The measurement device may be or comprise for example a microphone for testing a built in loudspeaker and/or a loud speaker for testing built in microphone and/or a light source for testing a built in camera. Alternatively, the finger may as well support at least one actuator, e.g. for activation of a control button or for inserting a plug in a corresponding socket.

Preferably, at least one finger supports a plug holder for attaching a plug to be inserted into a complementary socket of a mobile phone. The plug holder may comprise a fixed part and a movable part. The fixed part is preferably mounted to the base plate, e.g. via said finger. The fixed part and the movable part are connected by a joint, e.g. at least one bearing, preferably a linear bearing, to enable a translational movement of the movable part relative to the fixed part and thus relative to the rest structure. Alternatively or optionally, at least one bearing may enable to pivot and/or rotate the movable part relative to the fixed part and thus relative to the support structure. The fixed part comprises means for attaching said plug. By moving the movable part relative to the fixed part, the plug can be inserted into a complementary socket (inserted position) of the mobile phone or retracted into a so called retracted position.

Preferably, the plug holder does not comprise an actuator for moving the movable part relative to the fixed part, i.e. the movable part is preferably freely movable (only guided by the bearing) relative to the rest structure. Although the plug holder is devoid of an actuator, the plug may be inserted and retracted automatically by simply pushing the movable part and thus the plug into the desired position, e.g. by a robot being controlled by a controlling unit as explained below in more detail. The plug holder may thus be only a passive element, being much cheaper and as further advantage requiring less space on the base plate and thereby allowing better access to the mobile phone for other testing equipment like sensors, loudspeakers, flashlights and the like. However, the movable part's position and thus a corresponding plug's position can be controlled by the controlling unit, e.g. by controlling said robot, as well referred to as manipulator. Preferably the plug holder has a recess for engagement of a manipulator. For example, the movable part may comprise a recess into which the manipulator may engage for subsequently moving the movable part from a retracted position into an inserted position and/or vice versa. In at least one of the positions of the movable part, the movable part may be locked in the respective position, e.g. by a ball plunger and/or a magnet and/or friction.

The actual position of the plug can be monitored by the controller evaluating images from a camera being necessary for display testing. Thereby, the plug holder does not require separate position sensors and the accessibility of the mobile phone is further enhanced and the controlling unit however has detailed information about the positions of a plug holder's movable part and/or a plug being attached to it. A manipulator may be controlled by the controlling unit responsive to said information about the positions of a plug holder's movable part and/or the plug being attached to it.

If there are no fixed blocks and if the block surfaces are the surfaces of, e.g. vertically oriented bars, like rods or prisms, there are preferably at least five movable blocks. The movable blocks, preferably, each have a boom or base clamp (or, simply, clamp) with a lower surface contacting the base plate. They base plate facing surface of the base clamp is preferably in flush contact with the base plate. The clamp can be movable in a sliding manner over a plane surface of the base plate. Preferably, each base clamp has at least one long hole or slot into which a screw is movably inserted. The screw's distal end can be inserted into a threaded hole of the base plate or another part of the rest structure, to thereby enable releasably clamping the base clamp against the base plate (and/or the rest structure, respectively) and thereby fix its position and orientation.

Additionally, the base clamp may preferably comprise a through hole with a thread, the latter housing a set screw. The tip of the set screw points towards the base plate (and/or another part of the rest structure, respectively) and may be threaded towards the clamp against its support. The set screw preferably has a sharp e.g. cone-like tip at its distal end to safely position the block in a desired position by bracing the screw's tip against the base plate (and/or another part of the rest structure, respectively).

The base clamp preferably supports a bar, as mentioned above, in an upright position. The bar has at least one block surface extending at least approximately (±10°) orthogonal to the base plate's upper surface. Of course, the screwed connection of the base clamps to the base plate is only an example for any kind of releasable fastening means for fixing the positions of the blocks.

A mobile phone testing apparatus with the described phone holder preferably comprises a controlling unit. The controlling unit may be connected to a camera, the camera being configured for imaging the position and/or orientation of a mobile phone supported by said rest structure. In other words the camera is connected with the controlling unit of the tester for providing images of the mobile phone and preferably at least a part of the base plate to the controlling unit. The controlling unit is configured to determine the position and/or the orientation of the mobile phone based on said images. Thereby, inaccuracies in positioning the mobile phone on the rest structure can be detected and preferably compensated automatically by the controlling unit, for example when controlling a manipulator for operating at least one of the mobile phone's controls. It should be noted, that cameras are standard parts of mobile phone testing apparatuses, but so far only for imaging a display of a mobile phone to thereby determine faulty pixels or software problems, but not to determine the mobile phone's position and orientation. Of course the camera can be used for both, i.e. for imaging a display and as well monitoring the mobile phone's position and/or orientation.

Optionally the camera may be configured for imaging the position and/or orientation of the plug and/or plug holder. Then, the controlling unit may be configured to determine a position and/or orientation of a plug and/or a plug holder, e.g. of a mobile part of a plug holder as explained above, based on at least one image of said camera. If the plug holder has a recess for engagement of a manipulator, the recess may be used as well for detection of the mobile part's position by a controlling unit evaluating image data from said camera.

The tester is explained with reference to only one camera, but of course, the tester may comprise multiple cameras, to provide image data to the controlling units.

The mobile phone testing apparatus preferably further includes at least one manipulator for providing inputs to the mobile phone being supported by said rest structure. The manipulator, can be e.g. a robot with at least one "finger" which can be positioned in preferably at least three axes, to thereby being able to activate control buttons being positioned at the front side and/or the narrow side the mobile phone similar to a human. The finger can be simulated by a simple stick. If the mobile phone has a touch sensitive display, it can be touched of course as well by the manipulator, in particular the "finger" of the robot. The manipulator is preferably connected via a data line with the controlling unit for being controlled by the controlling unit. This manipulator may preferably be used (as well) for pushing a movable part of a plug holder without actuator, e.g. as explained above, into a desired position and is accordingly controlled by the controlling unit. Accordingly the controlling unit is configured to change the position and/or orientation of the movable part of the plug holder and/or a plug by providing control inputs to said manipulator. For example the controlling unit can be configured to control the manipulator to engage with the movable part of the plug holder and/or the plug in the respective actual position(s), which have been acquired from the image data. Subsequently the controlling unit may control the manipulator to the movable part of the plug holder and/or the plug to a desired position.

The camera is preferably configured to image the position and/or orientation of the manipulator, e.g. the tip of a robot actuated stick. Said images are provided to the controlling unit and the controlling unit determines from these images the current position and/or orientation of the manipulator. Based on the such obtained current position and/or orientation the controlling unit may send commands to the manipulator via a data line for changing the position and/or orientation to a desired position and orientation.

The phone holder as explained enables to adapt a mobile phone testing apparatus very easily to a new type mobile phone to be tested. In a first step, one positions a mobile phone's housing of a known type on the rest structure of said phone holder in a desired position and orientation. If the rest structure comprises means for providing a low pressure zone between the rest structure and the mobile phone's housing, e.g. a suction cup or the like, one preferably attaches the mobile phone's housing to the rest structure by engaging the low pressure zone. As well the mobile phone's housing may be pressed slightly on the rest structure, either by hand or by a manipulator. The mobile phone's housing may be for example an empty so to speak 'dummy' housing only for adjusting the phone holder to the respective model. It is particularly preferred if the housing has the same dimensions as the respective mobile phone but is at least in part transparent. Due to the transparency sensors or other measurement equipment may be positioned quickly and precisely even if they are partially or totally covered by the housing. Preferably, the dummy housing has marks indicating control buttons, camera openings, flash openings and preferably dummy socket connectors e.g. for USB cable, earphones or the likes.

After the mobile phone's housing has been positioned and oriented, the position and orientation of at least one block is adjusted to prevent the mobile phone's housing from slipping on the rest structure. Most preferably, at least one block is adjusted to be in contact with a narrow side of the mobile phone and releasably fixed in the respective position. The number of adjustable blocks may vary depending on the form of the blocks and of course of the housing. If there are only movable blocks, there are preferably at least five of them. The blocks are preferably positioned circumferentially around the support structure for contacting the mobile phone's respective narrow sides. Measurement devices or actuators can be positioned as required, and the mobile phone can be tested easily. After the position and/or orientation of the at least one block has been releasably fixed, the mobile phone's housing can be removed from the phone holder. If engaged, the optional low pressure zone should be disengaged. Subsequently, further mobile phones of the same type can be positioned on the rest structure and subjected to a test. Alternatively one may adapt the mobile phone holder to a different type of mobile phone by adjusting the blocks as explained above. A change of a model in the testing line can be accounted for by simply readjusting the blocks and, if required, the measurement devices.

As already mentioned above, the mobile phone's housing and/or the mobile phone may be suctioned to the rest structure by generating a low pressure zone between the rest structure and the mobile phone's housing and/or the mobile phone, to thereby fix the position of the mobile phone's housing and/or the mobile phone on the rest structure.

The method may further comprise imaging the mobile phone with at least one camera and determining the mobile phone's position and/or orientation on the rest structure from the image(s) obtained by said camera(s). Based on said position and/or orientation one can determine at least one position of the mobile phone's controls and drive a manipulator to actuate at least one of said mobile phone's controls in accordance with said previously determines position.

It is worth noting that the mobile phone holder as explained above and as well the methods for positioning a mobile phone are suited as well for other mobile communication devices, like e.g. so called tablet computers.

BRIEF DESCRIPTION OF THE DRAWINGS

In the following, the invention will be described by way of example, without limitation of the general inventive concept, on examples of embodiment and with reference to the drawings.

Figure 1:
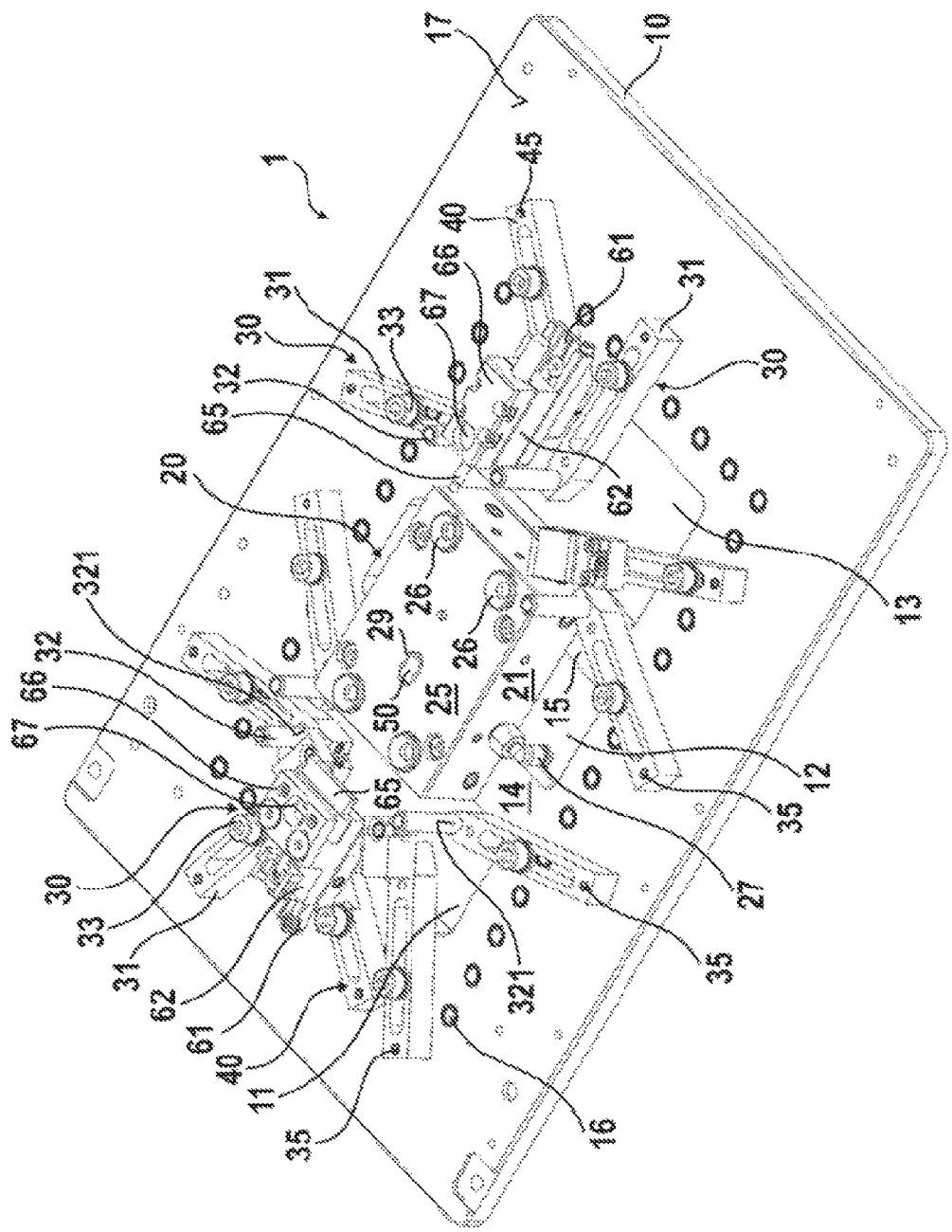
FIG. 1 shows an isometric view of mobile phone holder (without mobile phone).

While the invention is subject to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION

The isometric view in FIG. 1 shows a phone holder 1 with a base plate 10. The base plate 10 has an essentially plane first surface 17 with threaded holes 16 for positioning and clamping base clamps 31 of blocks 30 as explained below in more detail. Only for convenience, the first surface 17 is also referred to as upper surface, however it is understood by the skilled person, that the upper surface 17 is not necessary facing upwards.

A spacer 21 is mounted to the plane first surface 17 of the base plate 10. The spacer 21 has a box-like structure. The narrow sides of the boxes walls are positioned on the first surface 17. The spacer's 21, i.e. boxes rear side faces away from the base plate 10. The spacer 21 may support suction cups 26 being connected via a suction tube 27 to a vacuum pump. On top of the spacer may be a layer of an elastic material 25, e.g. made of rubber, silicone, fabric or the like. The spacer 21 and the layer of an elastic material can be considered to provide a rest structure 20.

The phone holder 1 has blocks 30 for blocking a movement of a mobile phone in a plane being at least approximately parallel to the first surface 17 of the base plate 10. Each block 30 has a base clamp 31 being arranged on the first surface 17. As depicted, the blocks 30 are preferably each in flush contact with the base plate 10 and/or the support structure. Each base clamp 31 has a long hole 34 and a screw 33 extends through each long hole 34 into the thread of one of the treaded holes 16. The position and orientation of each block 30 can thus be set by first selecting a threaded hole 16, positioning the long hole 34 above the respective threaded hole 16 and slightly screwing the screw 33 into the base plate 10. Before fastening the screw 33 the block's position and orientation can still be adjusted or so to speak 'fine tuned'. Subsequently the screw may be fastened to releasably clamp and thereby fix the block 30 between the screw head (without reference numeral) and the base plate 10 by frictional locking. So to speak the screw 33 is a clamping means for releasable fixing the block 30 by frictional locking with the base plate 10. Alternatively the block 30 could be clamped against the rest structure 20. Optionally the at least one of the base clamps may have a threaded through holes accommodating a set screw 35. After clamping the base clamp 31 to the base plate 10, the set screw's distal end may be so-to-speak pressed against the base plate 10 by turning the set screw 35. Thereby position and orientation of the base clamp 30 be additionally fixed, in particular if the screw's distal end is a sharp tip, e.g. a cone tip.

Each block 30 has a bar 32 at a distal end of the base clamp 31. The bar 32 has a block surface 321 for contacting a mobile phone's 100 narrow side.

Additionally to the blocks 30, there are fingers 40 carrying measurement devices and/or a plug holders 60 for inserting a plug connector into a corresponding socket of a mobile phone, a light source for testing the camera, a photodiode for testing the camera's flash light and the like. The fingers may be similar or identical to the base clamps 31 of the blocks 30 and can be positioned and oriented in the same way. The respective part of the description holds 'mutatis mutandis' as well for the fingers 40.

Each of the plug holders 60 has a fixed part 61 being mounted on top of a finger 40 and thus to the base plate 10. The finger 40 can be omitted, but enhances to easily adapt the plug holder's position and orientation to a mobile phone. The fixed part 61 has a rail surface for movably supporting a movable part 62 of the plug holder 60. The movable part 62 can be considered as slide being complementary to said rail surface. The rail surface and the slide surface are thus bearing means 64 for enabling a free movement of the movable part 62 of the plug holder 60 relative to the rest structure and/or the base plate.

Each of the movable parts 62 of the plug holder 60 has a recess for accommodating a plug 65. For fixing a plug 65 in the respective recess a retainer plate 66 may be mounted to the respective movable part 62. The retainer plate 66 preferably comprises a coupling bore 67. As explained below in more detail a stick 75 of a robot may be inserted into the coupling bore 67. Subsequently the stick 75 may be moved parallel to the rail surface for inserting or retracting a plug connector 65 into a corresponding socket of a mobile phone. In the figures two plug holders 60 are shown, however, it is pointed out that the phone holder may have any number of plug holders, preferably at least one plug holder 60.

Figure 2:
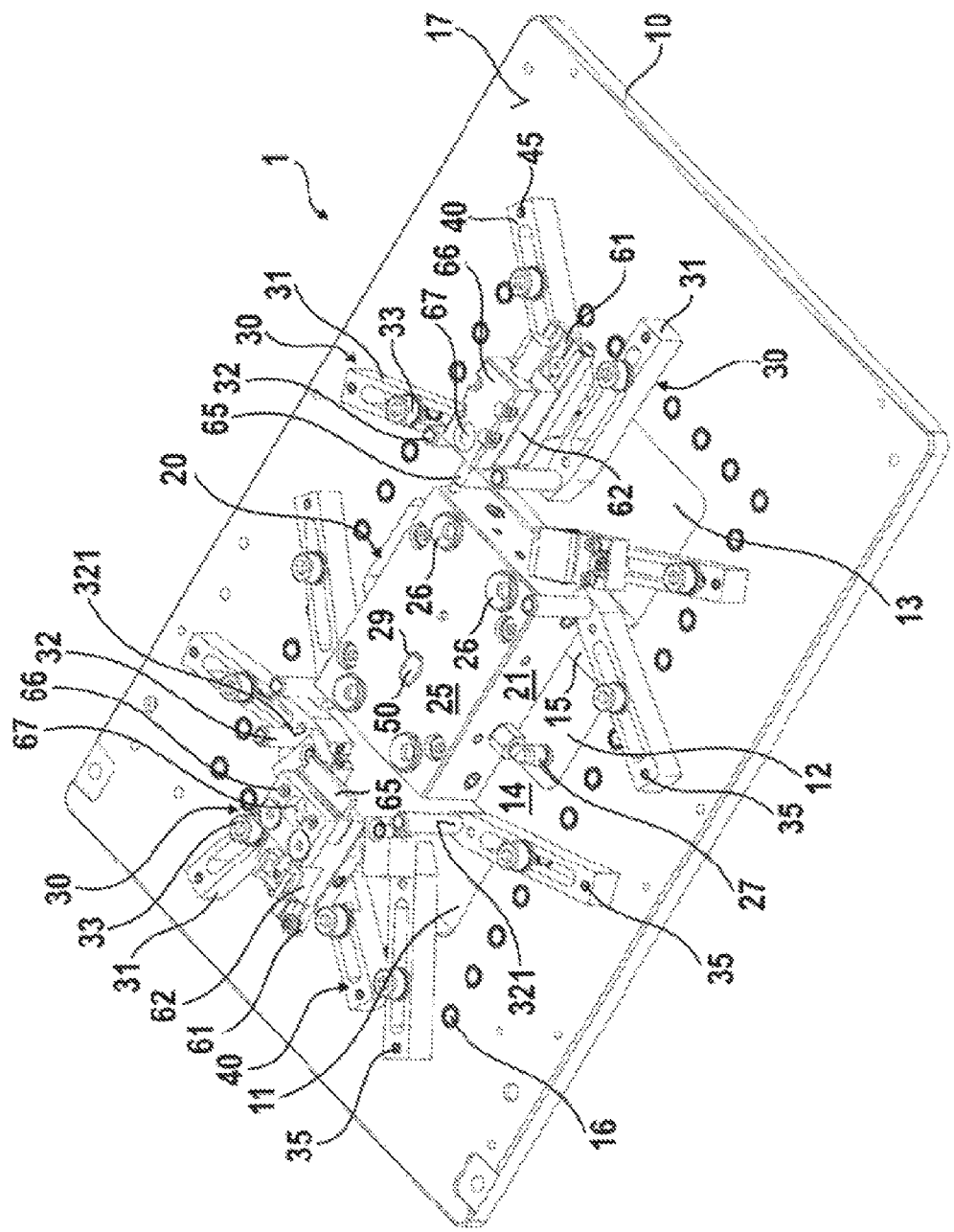
FIG. 2 shows the isometric view mobile phone holder (with mobile phone).

In FIG. 2 the same phone holder is shown as in FIG. 1, however, a mobile phone 100 has been positioned on the rest structure formed by the base plate 10, the spacer 21 with its suction cups 26 and the layer of an elastic material 25. As can be seen, the bars 32 of the blocks contact the mobile phone's 100 narrow side without hindering access to control buttons, card slots, socket connectors and the like. Even a part of the rear side of the mobile phone 100 is accessible, as the spacer's 21 orthogonal projection on the base plate 10 is smaller than the respective projection of the mobile phone 100. By though holes like 29 in the spacer 20 the accessible area can be further enhanced. Measurement devices 50 can be positioned in said openings 29 or behind of said openings 29 to access the mobile phone 100.

Figure 3:
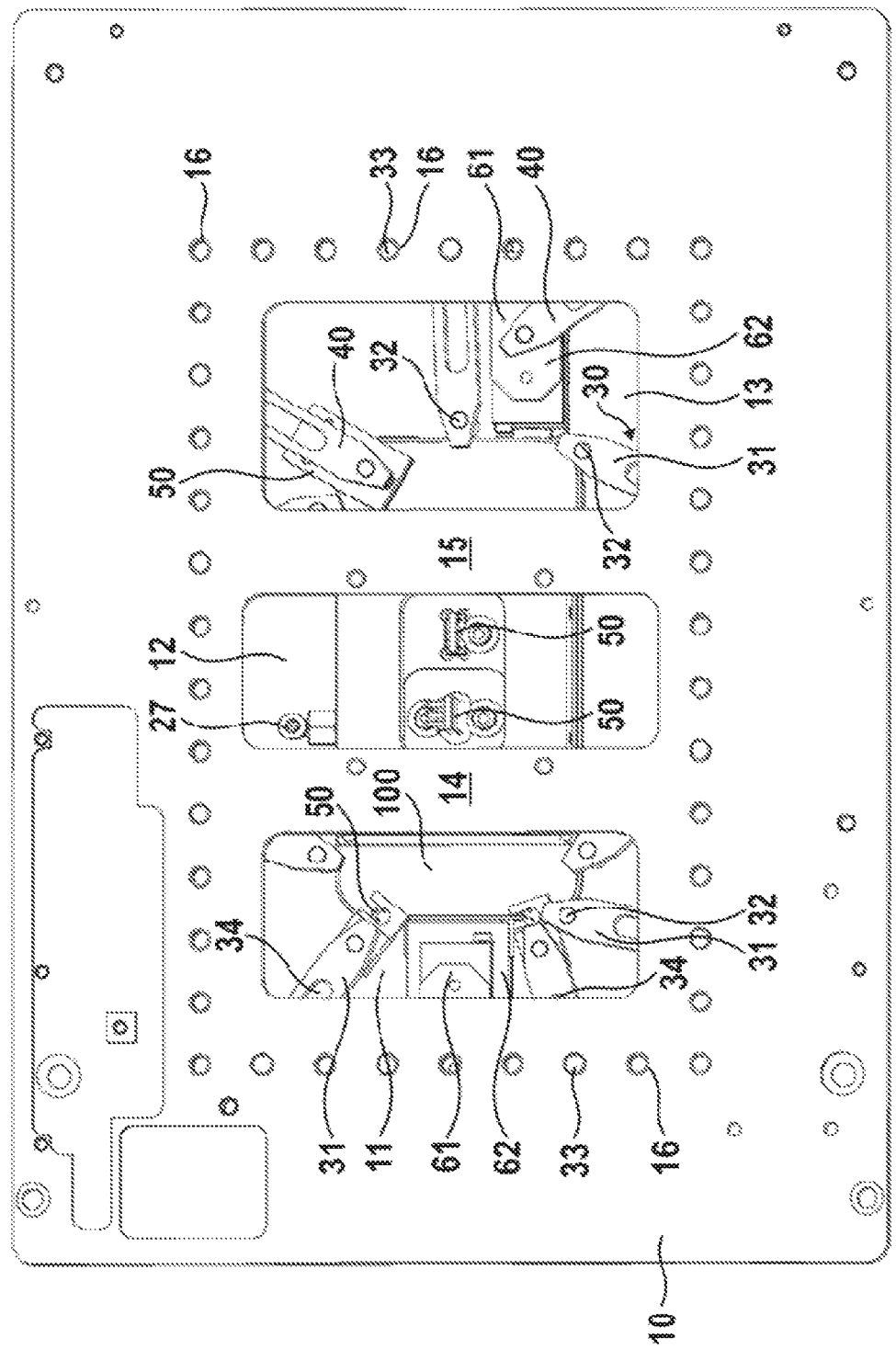
FIG. 3 shows a rear view of the mobile phone holder.

As best apparent from FIG. 3, showing the rear side of the mobile phone holder 1, the base plate has openings 11, 12, 13, for providing even better access to the mobile phone and the measurement devices and instruments. Between these openings 11, 12, 13 are beams 14, 15 for supporting the spacer 21.

Figure 4:
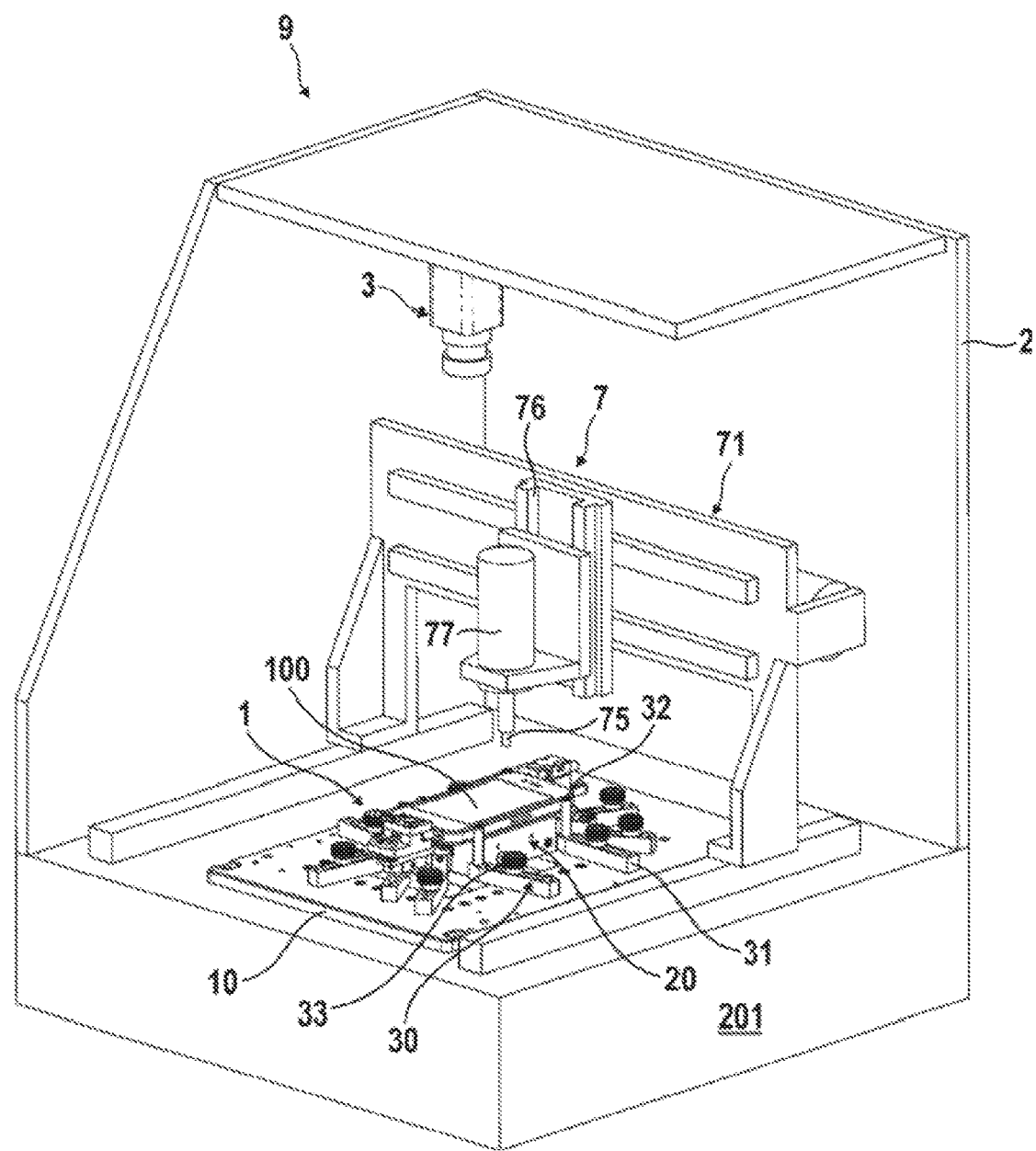
FIG. 4 shows a mobile phone testing apparatus.

In FIG. 4 a partially mounted mobile phone testing apparatus 9, briefly 'tester' 9 is depicted. The tester has a housing 2 which is shown incompletely to provide a look inside the housing 2. Inside the housing 2 is a receptacle for the base plate 10 of the mobile phone holder 1 as explained with reference to FIG. 1 to FIG. 3. The tester 9 comprises a robot 7 for positioning a stick 75 for operating control buttons of the mobile phone 100 or control fields on a touch sensitive display. In other words, the stick 75 simulates a user's fingers. Only as example, the robot 7 comprises a traveling bridge 71 for positioning the stick 75 in the x-z plane. An actuator 76 enables to adjust the position of the distal end of the stick in the y-direction. An (optional) force meter 77 being arranged between the actuator 76 and the stick 75 and being connected by a data line to the controlling unit enables to measure forces exerted by the robot 7 to the controls of the mobile phone 100 and to provide the forces to the controlling unit.

The traveling bridge design of the robot 7 is simple, reliable and enables to position the stick 75 with a high accuracy at comparatively low costs. However, the traveling bridge design is only a particular adapted design and any other suited robot design may be used as well.

Above the traveling bridge 71 is a camera 3 for imaging the mobile phone 100s and preferably as well the robot 7. The camera images the mobile phone 100 and at least a part of the phone holder 1 and preferably, depending on its position, as well the robot 7. The images are sent via a data line to a controlling unit that may be accommodated e.g. in the box like base 201 of the housing. The controlling unit may be configured for determining the position and orientation of the mobile phone 100 on the rest structure 20 based on said images and/or to control the robot 7 to operate the controls of the mobile phone 100 based on the said images.

For determining the position and orientation of the mobile phone, the travelling bridge 71 is preferably moved to a parking position to avoid that the mobile phone 100 is being masked by the robot. Based on the figures obtained by the camera 3 subsequently to moving the robot in said parking position the controlling unit determines the position and/or orientation of the mobile phone 100. In a next step, a test sequence can be started, including operating the controls (buttons, display etc.) of the mobile phone 100. For operating the controls, the controlling unit may determine the current position of the stick 75 based on images of said camera 75 and adjust the position of the stick 75 to a desired position.

Different from what is depicted the camera or an additional camera may as well be mounted to the robot to better image the display of the mobile phone, e.g. for activating controls being displayed on a touch sensitive screen. Alternatively at least one mirror may be used to provide the required perspective and/or the tester may comprise at least two cameras.

It will be appreciated to those skilled in the art having the benefit of this disclosure that this invention is believed to provide a method and an apparatus for testing cell phones, in particular a phone holder for mobile phone testing. Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

LIST OF REFERENCE NUMERALS 1 phone holder
2 housing
201 box like base of housing 2
3 camera
7 robot
71 traveling bridge
75 stick
76 actuator/preferably linear actuator
77 force meter/force sensor
9 mobile phone testing apparatus/tester
10 base plate
11 opening
12 opening
13 opening
14 beam
15 beam
16 threaded holes
20 rest structure
21 spacer
25 layer of elastic material
26 suction cup
29 opening in spacer 21
30 block
31 base clamp
32 bar
321 block surface
33 screw/clamping means
34 long hole
35 set screw
40 finger (base clamp as support for measurement devices, plug holders or actuators)
41 set screw
50 measurement device
60 plug holder
61 fixed part of plug holder
62 movable part of plug holder
63 means for attaching a plug
64 bearing
65 plug connector
66 retainer plate
67 coupling bore
100 mobile phone
101 mobile phone's housings

The invention claimed is:

1. A phone holder for a mobile phone testing apparatus, the phone holder comprising:
   a base plate,
   a rest structure on the base plate configured to support a mobile phone and thereby position the mobile phone parallel to the base plate,
   at least one block movably attached to at least one of the base plate and rest structure, the at least one block configured to contact a mobile phone's narrow side and thereby define a mobile phone's position on said rest structure, and
   clamping means for releasably fixing the at least one block relative to the at least one of the rest structure and base plate,
   wherein
   the rest structure comprises a layer of an elastic material with at least one suction cup having an opening facing away from the rest structure, the at least one suction cup configured to attach the mobile phone, positioned on the layer of an elastic material, to the rest structure by reducing pressure in the at least one suction cup.

2. The phone holder of claim 1, wherein
the clamping means is configured to releasably fix the at least one block to the base plate by pressing said at least one block against the base plate or the rest structure, to thereby obtain a frictional locking of the at least one block relative to the base plate or the rest structure, respectively.

3. The phone holder of claim 1, wherein
the rest structure comprises a spacer between the base plate and the layer of an elastic material.

4. The phone holder of claim 1, wherein
the base plate has at least one opening configured to provide access to the base plate facing side when the mobile phone is supported by the rest structure.

5. The phone holder of claim 3, wherein
the base plate has at least two openings between which there is at least one beam supporting the spacer.

6. The phone holder of claim 1, wherein
at least one finger is moveably attached to the base plate, wherein said at least one finger is disposed to support at least one of a measurement device and an actuator and a plug holder.

7. The phone holder of claim 1, wherein
the phone holder comprises at least one plug holder, the plug holder comprising:
   a first fixed part affixed to at least one of the base plate and the rest structure, and
   a second part freely moveable relative to the rest structure, the second part comprising means for attaching a plug connector, the plug connector configured to be inserted into a complementary socket of the mobile phone,
   wherein the first part and the second part are connected by a bearing configured to enable a free movement of the second part relative to the rest structure.

8. A method for testing a mobile phone, comprising:
positioning a mobile phone's housing on a rest structure of a phone holder in a desired position,
adjusting at least one of position and orientation of at least one block to be in contact with a narrow side of the housing,
removing the housing from the rest structure,
positioning the mobile phone on the rest structure such that the narrow side of the mobile phone is in contact with the at least one block,
performing at least one function test of the mobile phone,
imaging the mobile phone with a camera, and determining at least one of the mobile phone's position and orientation on the rest structure,
based on said at least one of the position and orientation, determining a position of at least one of the mobile phone's controls,
driving a manipulator to actuate the at least one of said mobile phone's controls,
imaging at least one of a moveable part of a plug holder and a plug of the mobile phone with the camera,
determining an actual position of the at least one of the movable part of the plug holder and the plug based on results of said imaging,
driving the manipulator to push the movable part of the plug holder from the actual position to the desired position, and inserting a stick of the manipulator into a coupling bore of the movable part of the plug holder, and subsequently pushing said movable part by moving the stick.

9. The method of claim 8, wherein at least one of the mobile phone's housing and the mobile phone is suctioned to the rest structure by generating a low pressure zone between the rest structure and the at least one of the mobile phone's housing and the mobile phone, to thereby fix a position of the at least one of mobile phone's housing and the mobile phone on the rest structure.

* * * * *

UNITED STATES PATENT AND TRADEMARK OFFICE
CERTIFICATE OF CORRECTION

PATENT NO. : 9,813,534 B2
APPLICATION NO. : 15/137147
DATED : November 7, 2017
INVENTOR(S) : Mihhail Koltsov et al.

Page 1 of 1

It is certified that error appears in the above-identified patent and that said Letters Patent is hereby corrected as shown below:

On the Title Page

On item (73), "Den Haag" should be --Schiphol--.

After item (63), please add foreign application priority data; --PCT/IB2013/002382, filed on October 24, 2013--.

Signed and Sealed this
Twelfth Day of March, 2019

Andrei Iancu
*Director of the United States Patent and Trademark Office*